United States Patent Office 3,499,941
Patented Mar. 10, 1970

3,499,941
PRODUCTION OF ORGANIC HALIDES
Edwin N. Givens, Glassboro, and Lyle A. Hamilton, Pitman, N.J., assignors to Socony Mobil Oil Company, Inc., a corporation of New York
No Drawing. Filed Dec. 10, 1965, Ser. No. 513,076
Int. Cl. C07c 17/36
U.S. Cl. 260—648                              15 Claims

ABSTRACT OF THE DISCLOSURE

A process for producing organic halides which comprises effecting reaction of an alcohol, e.g., ethyl alcohol, and a hydrogen halide, e.g., hydrogen chloride, at a temperature from about 0° to about 300° C. in the presence of a catalyst comprising an alumino-silicate containing active cation sites within an ordered internal structure, said ordered internal structure having a uniform pore size of from about 5 A. to about 15 A., e.g., a rare earth exchanged faujasite, and recovering an organic halide product, e.g., ethyl chloride.

---

This invention relates to the production of organic halides in the presence of an aluminosilicate that has unique catalytic activity. In particular, the invention relates to a process for producing alkyl, cycloalkyl, or aralkyl halides in the presence of aluminosilicate catalysts.

The invention contemplates a process in which organic halides are produced by effecting reaction of an alcohol and a hydrogen halide in the presence of an aluminosilicate catalyst containing active cation sites within an ordered internal structure. Thus, it has been found that alkyl alcohols (straight and branched chain), cycloalkyl alcohols, or aralkyl alcohols (i.e., aromatic alcohols in which a hydroxy group is located on a side chain attached directly to the aromatic ring) can be converted to their corresponding halides in the presence of aluminosilicate catalyst. This reaction can be illustrated by the following general equation:

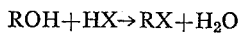

$$ROH + HX \rightarrow RX + H_2O$$

wherein R is a monovalent organic radical containing 1 to 30 carbon atoms and X is a halo group, i.e., bromo, chloro, iodo, or the like.

The term "monovalent organic radical" as used herein is intended to include alkyl, cycloalkyl, and aralkyl radicals as well as substituted derivatives thereof.

Exemplary of such radicals are the following: alkyl radicals, such as methyl, ethyl, n-propyl, isopropyl, n-butyl, t-butyl, n-hexyl, 2-ethyl-n-hexyl, n-octyl, n-dodecyl, and the like; cycloalkyl radicals, such as cyclohexyl and the the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, and the like; aralkyl radicals, such as benzyl, 2-phenylethyl, 3-phenyl-n-propyl, 1-phenyl-n-butyl, 1-phenyl-n-docasyl, and the like.

Representative of the alcohols that are suitable for the purpose of this invention are methanol, ethyl alcohol, isopropyl alcohol, n-propyl alcohol, n-butyl alcohol, isobutyl alcohol, t-butyl alcohol, n-amyl alcohol, iso-amyl alcohol, sec-amyl alcohol, n-hexyl alcohol, 2-methyl-4-hexanol, cyclohexanol, n-octyl alcohol, n-decyl alcohol, lauryl alcohol, 2-ethoxyethanol, 3-ethoxy-1-propanol, cetyl alcohol, benzyl alcohol, tolyl alcohol, and the like. In general, the alkyl alcohols containing from 1 to 15 carbon atoms are the most preferred reactants.

The hydrogen halides employed for converting alcohols to organic halides include hydrogen iodide, hydrogen bromide, hydrogen chloride and the like. In general, the halides are usually added to the reaction mixture as anhydrous gases or as solutions in nonpolar solvents.

In addition, it will be appreciated that polyhydric alcohols containing two or more hydroxy groups may also be reacted with hydrogen halides to produce organic halides in accordance with the process of this invention. Among the suitable polyhydric alcohols are the glycols, pinacols, glycerols, and the like. Whereas reaction of a polyhydric alcohol with the hydrogen halide may only involve replacement of one hydroxy group so that halohydrins (i.e. compounds containing a halo group and hydroxy group), are produced, halides containing two or more halo groups can also be produced. For example, pinacol reacts with hydrogen bromide to produce 2,3-dibromo-2,3-dimethyl-butane.

Among the organic halides that can be produced by this process are methyl chloride, ethyl chloride, ethyl bromide, n-propyl chloride, isopropyl chloride, n-butyl iodide, n-butyl chloride, n-amyl bromide, n-amyl chloride, iso-amyl bromide, n-hexyl chloride, cyclohexyl chloride, n-octyl chloride, benzyl chloride, benzyl bromide, and the like.

The production of organic halides in accordance with this invention, is conducted utilizing as a catalyst an aluminosilicate having an ordered internal structure which can be either naturally occurring or synthetically produced. These catalysts contain active sites that are formed by the presence of certain exchangeable metal cations and/or hydrogen ions ionically bonded or chemisorbed within the ordered internal structure of the aluminosilicate; preferably the cations are those which form a high concentration of hydrogen sites within the aluminosilicate.

It will be appreciated that the exchangeable cations and/or ions may be present within the catalyst by base exchanging them with either a naturally occurring or a synthetic alumino-silicate, by incorporating the cations and/or ions during the formation of a synthetic aluminosilicate, or by being an integral portion of a naturally occurring aluminosilicate. In general, the unique activity of the aluminosilicate catalyst for effecting the present reactions depends on the nature and concentration of its active sites as well as the availability of the sites for contact with the reactants.

In accordance with the present invention, several different types of aluminosilicates can be employed as catalysts. The preferred catalysts are the aluminosilicates that contain a high concentration of hydrogen sites within an ordered internal structure. These hydrogen sites are produced by ionically bonding or chemisorbing certain selected metal cations and/or hydrogen ions within the molecular structure of the aluminosilicate. Such bonding or chemisorption can be effected by base exchange of the aluminosilicate with a fluid medium containing the metal cations and/or hydrogen ions, the resulting exchanged product often thus acquiring an acid character.

It will be appreciated that in some cases, those aluminosilicates having a sparse distribution of hydrogen sites may also be employed as catalysts. Thus, alkaline earth metal (e.g., calcium, barium and the like) forms of the synthetic and naturally occurring aluminosilicates, including zeolite A and the faujasites, such as zeolites X and Y, may serve as catalysts. (These zeolites are hereinafter described in greater detail.)

Aluminosilicate catalysts having a high concentration of hydrogen sites can be prepared from a variety of naturally occurring and synthetic aluminosilicates. These aluminosilicates have exchangeable metal cations (e.g., alkali metals and alkaline earth metals) that can be completely or partially replaced, by conventional base exchange, with certain other metal cations and/or hydrogen ions to produce the necessary concentration of hydrogen sites within an ordered internal structure.

Some aluminosilicates can be base exchanged directly with hydrogen ions, as indicated in the preceding paragraph, to form products which have an acid character and which are suitable for use as catalysts. Other aluminosilicates such as zeolite X, a synthetic faujasite, are either not suitable for direct base exchange with hydrogen ions, or are not structurally or thermally stable after a portion of their exchangeable metal cations have been replaced with hydrogen ions. Thus, it is often necessary to exchange other metal cations with these aluminosilicates in order to achieve the necessary stability within the ordered internal structure prior to the inclusion of the hydrogen ions. Furthermore, the stability and the distribution of active cation sites formed within an aluminosilicate is also affected by the silicon to aluminum atomic ratio within its ordered internal structure. In an isomorphic series of crystalline aluminosilicates, the substitution of silicon for aluminum in the rigid framework of the lattice results in a decrease of total cation sites as evidenced by reduction of exchange capacity and proved by elemental analysis. Thus, among the faujasite isomorphs, the zeolite known as Y will have a sparser distribution of sites within its pores than the zeolite known as X.

It has been found that aluminosilicates having a high silicon to aluminum atom ratio are particularly desirable as catalysts, for purposes of this invention. As a rule, the ratio of silicon to aluminum atoms is at least about 1.8 to 1, in this preferred type catalyst. These catalysts are readily contacted with solutions which contain hydrogen ions and are readily regenerated, after having been used, by contact at elevated temperatures with an oxygen containing stream under controlled conditions such that carbonaceous residues can be efficiently removed without damage to the essential structure and properties of the catalyst.

It will be also appreciated that the concentration of the hydrogen sites, may vary according to the cations employed, the degree of base exchange, as well as the aluminosilicate being treated. Accordingly, it has been determined that the aluminosilicates having at least 0.5 milliequivalent of hydrogen per gram of hydrogen per gram of solid are effective catalysts for purposes of this invention. It will be understood that this value indicates the total concentration of hydrogen ions present within an aluminosilicate and that the spatial concentration of these ions is dependent on the ordered internal structure of the specific aluminosilicate being treated.

Because the unique activity of the aluminosilicate catalyst for effecting the reactions of the present invention is dependent on the availability of active cation sites therein, as well as the nature of these sites, the defined pore size of the aluminosilicate is to be considered during its preparation. In general, the aluminosilicate should have a pore size of such dimensions that it can accept the reactants of this invention within its order internal structure and allow egress of the products. It will be appreciated that in some instances, aluminosilicates having small pore sizes provide effective catalysts for production of aromatic products as well as the aliphatic halides heretofore described. Thus, the pore size is from at least about 5 A. and preferably about 5 A. to about 15 A. in diameter. It will be appreciated that the selection of the aluminosilicate catalyst, to be used in a specific application, will depend upon the reactants and also the reaction products.

Typical of the aluminosilicates employed in accordance with this invention, are several aluminosilicates, both natural and synthetic, which have a defined pore size of from 5 A. to 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline aluminosilicates utilized by the present invention is the synthetic faujasite designated as zeolite X, and is represented in terms of mole ratios of oxides as follows:

$$1.0\pm0.2M_{2/n}O:Al_2O_3:2.5\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

zeolite X is commercially available in both the sodium and the calcium forms.

It will be appreciated that the crystalline structure of zeolite X is different from most zeolites in that it can absorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another synthesized crystalline aluminosilicate, designated as zeolite A, has been found to be effective for the purposes of this invention. This zeolite may be represented in mole ratios of oxides as:

$$1.0\pm0.2M_{2/n}O:Al_2O_3:1.85\pm0.5SiO_2:yH_2O$$

wherein M represents a metal, $n$ is the valence of M, and $y$ is any value up to about 6.

The sodium form of this zeolite may be represented by the following formula:

$$Na_{12}(AlO_2)_{12}(SiO_2)_{12}\cdot 27H_2O$$

This material often designated as a "4A" zeolite, has a pore size of about 4 A. in diameter. When the sodium cations have been substantially replaced with calcium by conventional exchange techniques, the resulting zeolite is designated as a "5A" zeolite and has a defined pore size of about 5 A. in diameter.

Other aluminosilicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

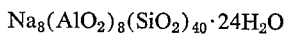

$$Na_8(AlO_2)_8(SiO_2)_{40} \cdot 24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other aluminosilicates can be employed as catalysts for the processes of this invention. One of the criteria for such catalyst is that its ordered internal structure must have defined pore sizes of sufficient diameters to allow entry of the preselected reactants and the formation of the desired reaction products. Furthermore, the aluminosilicate advantageously should have ordered internal structure capable of chemisorbing or ionically bonding additional metals and/or hydrogen ions within its pore structure so that its catalytic activity may be altered for a particular reaction. Among the naturally occurring crystalline aluminosilicates which can be employed are faujasite, heulandite, clinoptilolite, chabazite, gmelinite, mordenite and mordenite-like structures, and dachiardite.

One of the preferred aluminosilicate catalysts is prepared from the sodium form of zeolite X having a pore size of about 13 A. This aluminosilicate is a commercially available zeolite designated as Linde "13X" and is treated by conventional base exchanging involving partial or complete replacement of the sodium zeolite X by contact with a fluid medium containing cations of one of the rare earth metals. Any medium which will effect ionization without affecting the crystalline structure of the zeolite can be employed. After such treatment, the resulting exchanged zeolite product is water washed, dried and dehydrated. The dehydration thereby produces the characteristic system of open pores, passages, or cavities of the crystalline aluminosilicates.

As a result of the above treatment, the rare earth exchanged aluminosilicate is an activated crystalline catalyst material in which the molecular structure has been changed by having rare earth cations chemisorbed or ionically bonded thereto. Because specific rare earth metal cations can be base exchanged with the aluminosilicate, the concentration of hydrogen cation sites produced within the catalyst can vary depending on the completeness of the exchange as well as the rare earth cations employed. Thus, it has been found that the rare earth exchanged zeolite X catalyst can contain from about 0.5 to about 1.0 milliequivalent of hydrogen per gram of solid catalyst. Furthermore, it will be appreciated that the defined pore size of the rare earth exchanged zeolite X may vary from above 6 A., generally from 6 A. to 15 A., and preferably in the approximate range of 10 A. to 13 A. in diameter.

Advantageously, the rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lathanum, 45–46% by weight; cerium, 1–2% by weight; praseodymium 9–10% by weight, neodymium, 32–33% by weight; samarium, 5–6% by weight gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen ions to replace the sodium cations from the aluminosilicate. The base exchange can be accomplished by treatment with fluid medium containing the rare earth salts followed by another containing hydrogen ions or cations capable of conversion to hydrogen ions. Inorganic and organic acids represent the source hydrogen ions, whereas ammonium compounds art representative of the compounds containing cations capable of conversion to hydrogen ions. It will be appreciated that this fluid medium can contain a hydrogen ion, an ammonium cation, or mixture thereof, and have a pH from about 1 to about 12.

Other effective catalysts can be prepared from aluminosilicates such as zeolite Y and mordenite. Advantageously, exchange of rare earth metals for the sodium cations within zeolite Y produces a highly active catalyst in a manner similar to that described for preparation of the rare earth exchanged zeolite X. In addition, because of its high acid stability, zeolite Y may be treated by partially replacing the sodium ions with hydrogen ions. This replacement can be accomplished by treatment with a fluid medium containing a hydrogen ion or an ion capable of conversion to a hydrogen ion (i.e., inorganic acids or ammonium compounds or mixture thereof).

Zeolite "5A" also can serve as an effective catalyst. Also, although this zeolite material can be base exchanged with other divalent metal cations in a manner similar to that described for preparation of the rare each exchanged faujasites; usually it is used in its calcium form.

Mordenite can be activated to serve as a catalyst for the instant invention by replacement of the sodium ion with a hydrogen ion. The necessary treatment is essentially the same as that described above for the preparation of acid zeolite Y except that a mineral acid such as HCl is used as a source of hydrogen ion. In general, the mordenite is reduced to a fine powder (approximately passing a 200 mesh sieve and preferably passing 300 and 325 mesh sieves or finer) and then acid treated.

It will be appreciated that cations of metals other than the rare earths having mono- and polyvalences can be employed to replace the exchangeable cations form the aluminosilicates to provide effective catalysts for this invention. Exemplary of these metals are zinc, magnesium, tin, cobalt, nickel and the like. Moreover, other higher valence metals such as zirconium, titanium, vanadium, chromium, manganese, iron, tungsten, and the like can also be employed. It will be appreciated that certain divalent metals such as calcium, barium, and magnesium can be used with ammonium chloride or like ammonium compounds to produce active cation sites within the aluminosilicate catalyst by conventional base exchange techniques, the ammonium ion being decomposed to form hydrogen sites by heating the exchanged aluminosilicate to drive off ammonia.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may be prepared by growing crystals of the aluminosilicate in the pores of the support. Also, the aluminosilicate may be intimately composited with a suitable binder, such as inorganic oxide hydrogel or clay, for example by ball mililng the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered from in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, II–B, and IV–A of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of about 1/16" to about 1/8" in diameter, obtained upon pelleting the aluminosilicate with a suitable binder such as clay. The zeolite X, described hereinabove, may be obtained on a clay-free basis or in the form of pellets in which clay is present as a binder.

The processes of this invention may be operated over a wide range of reaction temperatures, i.e., from about 0° C to about 300° C. Thus, it has been found that reaction between ethanol and hydrogen chloride to produce ethyl chloride is preferably conducted over a range of from about 130° to about 300° C.

It will be appreciated that the choice of reaction temperatures is often determined by the catalysts that are used. In general, catalysts that contain a high concentration of hydrogen sites, i.e., rare earth exchanged zeolite X, hydrogen zeolite Y or the like, are more active than those catalysts that have a sparse distribution of acid sites, i.e., sodium forms of zeolite X or zeolite Y. Accordingly, higher temperatures may be required to effect reactions in which the less active catalysts are employed.

The pressures utilized by this process may extend from about atmospheric to superatmospheric pressures. Often the process is conducted at atmospheric pressure. Advantageously, it has been found that extended catalytic activity and improved yields of halide products may be obtained by effecting reactions at pressures generally in excess of 100 p.s.i. and in some instances at pressures above 1000 p.s.i.

Various amounts of the reactants can be used for purposes of the present invention. As a rule, the amount of the hydrogen halide is usually used in excess, the excess amount passing off with water and the other products of the reaction.

It will be appreciated that the reactants are usually present in the reaction vessel as fluids and, in some instances, inert solvents such as chloroform and the like are used as part of the reaction medium.

The amount of catalyst used to effect the reactions of this invention may vary considerably depending on whether the reaction is conducted as a batch-type operation, a continuous, or a semi-continuous process. Generally, during batch-type operation it has been found that the amount of catalyst may extend from about 5 percent by weight to about 25 percent by weight of the charged alcohol. In continuous or semi-continuous processes where one or more reactor vessels are employed with cyclic regeneration of the catalyst, the amount of catalyst, as measured in terms of the liquid hourly space velocities of the alcohol may be in the range from about 0.1 to about 10. It will be understood that the catalysts of this invention may be readily regenerated during the cyclic continuous processes or subsequent to their use in batch-type operation by burning the contaminants off in an air stream at temperatures of about 500° C. from about one to about three hours.

In addition, the unique activity of the alumino-silicate catalysts can be continuously maintained, while on stream, at a high level. This is accomplished by controlling the sparsity of distribution of active sites within the ordered internal structure of the aluminosilicates. It will be realized, for example, that during reaction of hydrogen chloride with methanol and the like, some degradation and polymerization products may be formed which coat the aluminosilicate catalyst. This coating may block off the active sites of the catalyst from contact with the reactants, thus, gradually causing the catalyst to lose its effective acivity. The adverse effects of the degradation and polymerization products is conveniently minimized by the introduction of carbon dioxide and other like oxygen-containing compounds into the catalyst zone. It will be appreciated that these activators can be introduced into the charge stream or introduced as a separate stream. Activators are particularly effective when employing, as catalysts, the metal salts which produce a sparse concentration of hydrogen sites within the aluminosilicates. In general, the molar ratio between the reactants and the activators can range from about 0.001 to about 5.0.

It will be appreciated that the operating conditions employed by the present invention will be dependent upon the specific reaction being effected. Such conditions as temperature, pressure, space velocity, and the like, will have important effects on the process. Accordingly, the process of this invention may be more readily understood by reference to the following specific examples:

EXAMPLE I

This example illustrates the activity of the aluminosilicate catalysts of this invention for promoting reaction between ethanol and hydrogen chloride to form ethyl chloride over a range of operating temperatures. Several runs were conducted in electrically heated cylindrical Vycor glass reactors (6 inches long with a 1 inch diameter), each having a central thermocouple well extending through a bed of catalyst particles.

After the catalyst was heated to the reaction temperatures, i.e., from about 130° to about 290° C., the reactants were introduced into the reactor at controlled flow rates (i.e., ethanol at 3.81 ml./hr. and hydrogen chloride at 49 cc./hr.) through gas inlet tubes at the top of the reactor. The exit gas from the reactor was collected and fractionated by a condensing system located at the bottom of the reactor. Samples of the product in each fraction were periodically removed and analzed by vapor phase chromotography, infraed, or mass spectroscopic techniques.

Runs were conducted from 2-6 hours in duration with measurements of the collected fractions being made at 20 minute intervals. As shown by the data gather in the table below, quantitative conversions were obtained over the full range of operating temperatures using a variety of the alumino-silicate catalysts.

TABLE 1.—CONVERSION OF ETHYL ALCOHOL AND HYDROGEN CHLORIDE TO ETHYL CHLORIDE OVER ALUMINOSILICATE CATALYSTS

| Catalyst | Temp. (°C.) | Yield (mole percent) Ethyl chloride | Ethylene | Ethyl chloride (ml./hr.) |
|---|---|---|---|---|
| REX [1] | 130 | 2 | 0 | 0.1 |
| | 150 | 16 | 0 | 0.7 |
| | 170 | 84 | 0 | 3.8 |
| | 190 | 89 | 11 | 4.2 |
| | 210 | 76 | 12 | 3.9 |
| | 230 | 72 | 28 | 3.3 |
| | 250 | 48 | 41 | 2.2 |
| | 270 | 35 | 57 | 1.3 |
| 13X [2] | 170 | 33 | 5 | 1.4 |
| | 200 | 61 | 3 | 2.5 |
| | 230 | 93 | 5 | 4.2 |
| | 260 | 100 | 10 | 4.6 |
| | 290 | 82 | 10 | 4.4 |
| 5A [3] | 170 | 10 | 14 | 0.4 |
| | 200 | 66 | 15 | 3.0 |
| | 230 | 88 | 11 | 4.0 |
| 10X [4] | 170 | 22 | 8 | 1.7 |
| | 200 | 84 | 12 | 3.8 |
| | 230 | 99 | 10 | 4.5 |
| HY [5] | 170 | 86 | 5 | 3.8 |
| | 200 | 100 | 8 | 4.5 |
| | 230 | 68 | 25 | 3.0 |
| REY [6] | 170 | 77 | 4 | 3.4 |
| | 200 | 92 | 13 | 4.2 |

[1] Rare earth exchanged zeolite X.
[2] Sodium zeolite X.
[3] Calcium zeolite A.
[4] Calcium exchanged zeolite X.
[5] Hydrogen zeolite Y.
[6] Rare earth exchanged zeolite Y.

From inspection of the above data it will be apparent that the yield of ethyl chloride can be optimized by selection of certain reaction temperatures for a specific aluminosilicate catalyst. For example, temperatures of from about 170° to 230° C. promote higher yields of ethyl chloride over the rare earth exchanged zeolite X; whereas temperatures of from about 200° to 290° C. promote higher yields of ethyl chloride over the sodium form of zeolite X. Accordingly, it will be appreciated that the selectivity of more active aluminosilicate catalysts for production of the organic halides is greater at lower temperatures than that of the less active aluminosilicate catalysts.

EXAMPLE II

Using the apparatus and general procedure described in Example I, n-propyl alcohol at a LHSV of 0.75 and hydrogen chloride in a molar ratio of 2 moles of hydrogen chloride to 1 mole of n-propyl alcohol are passed over a catalyst of sodium zeolite X heated to 170° C. Analysis of the exit gas shows that it contains 27% n-propyl chloride, 3% isopropyl chloride, 8% isopropyl alcohol, 61% n-propyl alcohol, and 1% propylene, all percentages being on a weight basis.

EXAMPLE III

This example illustrates the production of ethyl bromide in accordance with this invention. A catalyst of rare earth exchanged zeolite Y is placed in a Vycor reactor and heated to 170° C. Then ethyl alcohol at a LHSV of 0.84 and hydrogen bromide at a molar ratio of hydrogen bromide to ethyl alcohol of 2:1 are passed over the catalyst. Analysis of the exit gas stream by vapor phase chromatography shows that it contains 40% by volume of ethyl bromide.

EXAMPLE IV

Two and one-half grams of a rare earth exchanged zeolite X catalyst are placed in a stirred reactor and 50 grams of cyclohexanol are added to the reactor. The contents of the reactor are heated to 100° C. and hydrogen chloride passed into the reactor for 1.5 hours. Then the contents are cooled and the catalyst is filtered off. Analysis of the product shows it to contain 11% by weight of chlorocyclohexane, 14% by weight of cyclohexene, and 75% by weight of cyclohexanol.

It will also be appreciated that the examples set forth above as well as the foregoing specification are merely illustrative of the different alcohols and hydrogen halides that are used in accordance with the present process and that other such reactants may be employed in the presence of the aluminosilicate catalysts contemplated by this invention.

It will further be appreciated that the aluminosilicates having active cation sites other than those used in the examples may be employed as catalysts for this process and that various modifications and alterations may be made in the process without departing from the spirit of the invention.

What is claimed is:

1. A process for producing organic halides which comprises effecting reaction of an alcohol selected from the group consisting of alkyl, cycloalkyl, and aralkyl alcohols containing from 1 to 30 carbon atoms and at least one hydroxy group and a hydrogen halide selected from the group consisting of hydrogen chloride, hydrogen iodide, and hydrogen bromide at a temperature of from about 0° to about 300° C. in the presence of a catalyst comprising an alumino-silicate containing active cation sites within an ordered internal structure, said ordered internal structure having a uniform pore size of from about 5 A. to about 15 A. and recovering an organic halide corresponding to said alcohol wherein at least one of said hydroxy groups is replaced by a halo group.

2. The process of claim 1 in which the cation sites are produced by cations selected from the group consisting of exchangeable metals, ammonium, hydrogen, and mixtures thereof.

3. The process of claim 1 in which the cations are of the rare earth metals.

4. The process of claim 1 in which the aluminosilicate catalyst is selected from the group consisting of a faujasite and isomorphs thereof.

5. The process of claim 1 in which the aluminosilicate catalyst is a rare earth exchanged faujasite.

6. The process of claim 1 in which the aluminosilicate catalyst is hydrogen exchanged zeolite Y.

7. The process of claim 1 in which the aluminosilicate catalyst is a rare earth exchanged zeolite X.

8. The process of claim 1 in which the aluminosilicate catalyst is a calcium form of zeolite A.

9. The process of claim 1 in which the aluminosilicate catalyst is a calcium form of zeolite X.

10. The process of claim 1 in which the aluminosilicate is supported by a matrix binder.

11. The process of claim 1 in which said reaction is conducted from about atmospheric to superatmospheric pressures.

12. The process of claim 1 in which the alcohol is ethyl alcohol and the organic halide is ethyl chloride.

13. The process of claim 1 in which the alcohol is n-propyl alcohol and the organic halide is n-propyl chloride.

14. The process of claim 1 in which the alcohol is cyclohexanol and the organic halide is chlorocyclohexane.

15. The process of claim 1 in which the alcohol is ethyl alcohol and the organic halide is ethyl bromide.

References Cited

UNITED STATES PATENTS

| | | | |
|---|---|---|---|
| 2,904,607 | 9/1959 | Mattox et al. | 260—671 |
| 3,058,805 | 10/1962 | Weber | 23—113 |
| 3,114,603 | 12/1963 | Howell | 23—113 |
| 3,254,023 | 5/1966 | Miale et al. | 260—663 X |
| 3,321,272 | 5/1967 | Kerr | 23—113 |
| 3,341,579 | 9/1967 | Kunstle et al. | 260—657 X |

FOREIGN PATENTS 6504865  10/1965  Netherlands.

DANIEL D. HORWITZ, Primary Examiner

U.S. Cl. X.R.

252—455; 260—651, 657

PO-050
(5/69)

UNITED STATES PATENT OFFICE
CERTIFICATE OF CORRECTION

Patent No. 3,499,941      Dated March 10, 1970

Inventor(s) E. N. GIVENS and L. A. HAMILTON

It is certified that error appears in the above-identified patent and that said Letters Patent are hereby corrected as shown below:

Col. 1, Line 4 "Socony Mobil Oil Company Inc." should be --Mobil Oil Corporation--

Col. 1, Line 60 "docasyl" should be --docosyl--

Col. 3, Line 42 "hydrogen per gram of" repeated

Col. 5, Line 43 "sodium zeolite X" should be --sodium of zeolite X--

Col. 5, Line 65 "zeolita" should be --zeolite--

Col. 6, Line 9 "9-10% by weight, neodymium, 32-33% by weight;" should be --46% by weight; cerium, 1-2% by weight; praseodymium--

Col. 6, Line 10 "46% by weight; cerium, 1-2% by weight; praseodymium" should be --9-10% by weight, neodymium, 32-33% by weight;--

Col. 6 Line 19 "The" should be --This--

Col. 6, Line 45 "each" should be --earth--

Col. 6, Line 58 "cations form" should be --cations from--

Col. 7, Line 21 "mililng" should be --milling--

SIGNED AND
SEALED
NOV 24 1970

(SEAL)
Attest:

Edward M. Fletcher, Jr.
Attesting Officer

WILLIAM E. SCHUYLER, JR.
Commissioner of Patents